Nov. 20, 1928.
J. WARNER
RESILIENT WHEEL
Filed March 1, 1928
1,692,011
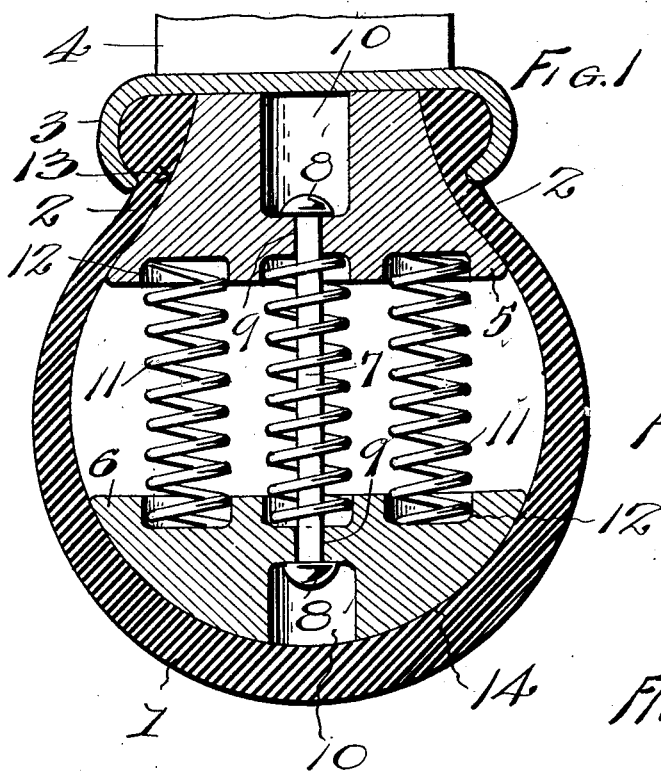
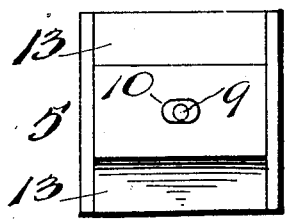
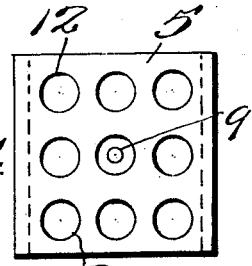
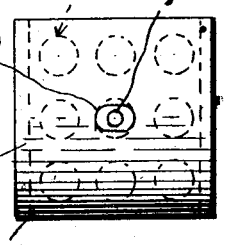
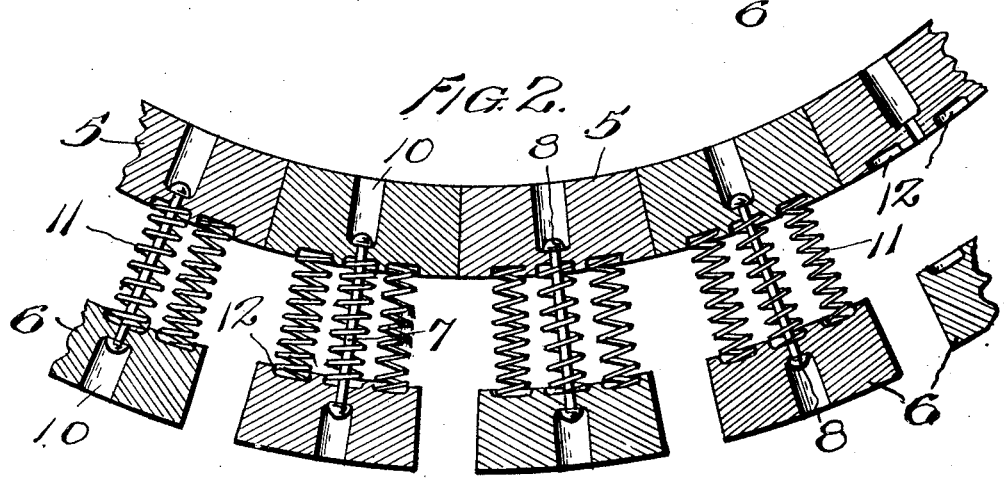
Inventor
JAMES WARNER
By Fenelon B. Brock
Attorney Patented Nov. 20, 1928.

1,692,011

UNITED STATES PATENT OFFICE.

JAMES WARNER, OF OGDEN, UTAH.

RESILIENT WHEEL.

Application filed March 1, 1928. Serial No. 258,341.

My present invention relates to improvements in resilient wheels of the type utilizing segmental cores within the tire casing between which cores are interposed radially extending springs to provide an air space within the tire casing between the cores and to insure the proper resiliency in the wheel as the load is imposed thereon.

In carrying out my invention, I utilize two series of segmental blocks of which series the inner one comprises blocks that are in frictional contact, while the outer series comprises blocks that are spaced apart to insure the proper movement of the portions of the tire as it is compressed, and allowed to expand.

The invention consists in certain novel combinations and arrangements as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1 is a transverse sectional view through a tire or wheel embodying the principles of my invention;

Fig. 2 is a sectional detail view showing segmental blocks which form the inner and outer cores of the resilient wheel;

Fig. 3 is a view showing the inner face of an inner segmental block;

Fig. 4 is a view showing the outer face of an inner segmental block; and

Fig. 5 is a view showing the outer face of an outer segmental block.

In the physical embodiment of my invention, I use a tire casing 1 of well known type which is provided with the side walls 2 that are fashioned with the usual anchoring beads and these side walls and beads are retained by the channel rim 3. The felly of the wheel is indicated at 4 in Fig. 1 and it will be understood that these parts are of usual construction.

In carrying out my invention, I utilize an inner core made up of segmental blocks 5 and an outer core made up of spaced segmental blocks 6, these blocks being fashioned from a suitable material and the blocks of each series being identical in size and shape and thus standardized so that the number of blocks in the two series may be varied in accordance with the size of the wheel tire into which they are to be incorporated.

The blocks of the two cores are connected in pairs by bolts 7 which have heads 8 at their ends and pass through bolt holes 9 in the respective blocks. These bolts radiate from the hub of the wheel as a center and each pair of blocks 5 and 6 is connected by one of the bolts. Relative movements of the blocks are permitted on the bolts so that the wheel may change its shape in passing over obstructions or irregularities in the ground, and the blocks are provided with pockets 10 to accommodate the heads 8 when the outer series of blocks are moved inwardly. To compensate for the inward movement of the outer core, I provide a plurality of springs 11 between each pair of complementary blocks 5 and 6. The ends of the springs are seated in recesses 12 that are provided in the adjoining faces of the outer and inner blocks and one of the springs 11 is coiled about the bolt 7 and interposed between the blocks. In the drawings, I have shown provision for nine springs between each pair of blocks, but it will be understood that this number may be increased or diminished to suit different conditions in the wheel structure. The springs as shown in Fig. 4, are spread over a sufficient area on the adjoining faces of the blocks 5 and 6 to insure a uniform and equalized movement as the outer series of blocks or core 6 is moved inwardly. The springs of course provide resiliency between the outer core and the inner core, and of course the casing 1 is also made of resilient material so that the portion of the tire receiving the load may be flexed and the springs provide the necessary resiliency for neutralizing the movement of the tread portion of the tire.

The blocks 5 forming the inner core are in frictional contact one with another, and they are fashioned with concaved faces 13 which conform to the side walls of the tire casing 1 and fit neatly within the tire casing.

The outer faces 14 of the blocks 6 in the outer core are rounded to conform to the curved concave face or inner periphery of the tire casing and these blocks 6 which are slightly spaced apart as indicated in Fig. 2, receive the load and provide for the resilient flexibility of the tire.

The number of blocks 5 in the inner core and the number of blocks 6 in the outer core may be varied to suit different conditions, and it will be apparent that as thus constructed the wheel will perform its functions in a comparatively perfect manner.

Having thus fully described my invention, what I claim as new and desire to secure by Letters Patent is—

1. The combination with an enclosing tire and its rim, of an inner core comprising a series of frictionally engaged segmental blocks, an outer core comprising a series of spaced segmental blocks, springs interposed between said cores, and a bolt loosely connecting the blocks of the inner and outer cores in pairs.

2. The combination in a resilient tire with an inner segmental block having recesses forming spring seats, a bolt hole, and a socket, of an outer segmental block having recesses forming spring seats, a bolt hole, and a socket, a bolt connecting said blocks and having heads in said sockets, and a plurality of springs interposed between said blocks and seated in said recesses.

JAMES WARNER.